United States Patent [19]

Zeidler

[11] Patent Number: 5,224,191
[45] Date of Patent: Jun. 29, 1993

[54] STRANDING ELEMENT FOR OPTICAL CABLES

[75] Inventor: Guenter Zeidler, Germering, Fed. Rep. of Germany

[73] Assignee: Siemens Aktiengesellschaft, Munich, Fed. Rep. of Germany

[21] Appl. No.: 874,379

[22] Filed: Apr. 27, 1992

[30] Foreign Application Priority Data

Jul. 1, 1991 [DE] Fed. Rep. of Germany ....... 4121744

[51] Int. Cl.⁵ ................................................. G02B 6/44
[52] U.S. Cl. .................... 385/111; 385/109; 385/112
[58] Field of Search ............... 385/110, 111, 112, 113, 385/114, 109

[56] References Cited

U.S. PATENT DOCUMENTS

| | | |
|---|---|---|
| 4,331,379 | 5/1982 | Oestreich et al. .................... 385/109 |
| 4,457,583 | 7/1984 | Mayr et al. ............................ 385/113 |
| 4,822,132 | 4/1989 | Oestreich ............................. 385/112 |
| 4,906,067 | 3/1990 | Mayr et al. ............................ 385/112 |
| 4,983,013 | 1/1991 | Dotzer et al. ......................... 385/110 |

Primary Examiner—John D. Lee
Assistant Examiner—Phan T. Heartney
Attorney, Agent, or Firm—Hill, Steadman & Simpson

[57] ABSTRACT

A stranding element for use in forming optical cables has an envelope and a plurality of bands, which are each formed of a plurality of light waveguide fibers arranged in a band stack. The band stack is received in a cavity of the envelope of the stranding element. In one embodiment, the envelope has a cross sectional cavity corresponding to the band and the envelope and band stack are longitudinally twisted substantially the same amount. In another embodiment, the band stack is received in a skin and is twisted in an envelope, which has a hollow tubular form.

19 Claims, 1 Drawing Sheet

STRANDING ELEMENT FOR OPTICAL CABLES

BACKGROUND OF THE INVENTION

The present invention is directed to a stranding element for optical cables, which element includes a plurality of light waveguide fibers that are respectively combined in groups to form a plurality of small bands which are formed into a band stack.

U.S. Pat. No. 4,983,013, whose disclosure is incorporated herein by reference thereto and which claims priority from the same German Application as European Patent Application 0 356 786, discloses an optical cable which has a cable core provided with approximately rectangular chambers. A cable utilizing a core element of this type is often referred to as "chambered cables" and are utilized in combination with ribbon lines, for example a plurality of light waveguides which are combined to form a band or ribbon having an approximately rectangular cross section. A plurality of these bands or ribbons are united to form a band stack that is then introduced into a correspondingly constructed chamber of the core.

SUMMARY OF THE INVENTION

An object of the present invention is to create a stranding element for cables that is founded on the basis of bands having light waveguide fibers that are combined group-by-group.

This object is achieved with an improvement in a stranding element including a band stack formed of a plurality of bands, with each of the bands including a group of light waveguide fibers. The improvement is that the stranding element envelope has a cavity which receives the band stack with play and the bands are arranged lying on top of one another in the band stack, likewise, with play so that a sliding motion between bands can occur without a change in the position being possible and that the band stack can be helically twisted. In the arrangement of the present invention, all bands and all light waveguide fibers contained therein have the same average length, and this corresponds to approximately the outer length of the cylindrical stranding element.

Given the stranding element provided here, the light waveguide fibers are combined in a resilient, elastic material to form what is referred to as a "fiber band", wherein 2, 4, 8, 10, 12 or 16 light waveguide fibers preferably lie side-by-side tightly packed in a plane or in an arc. Thus, each band can have a fiber count in a range of between 2 and 16. These individual bands are then stacked on top of one another and are helically twisted along the stranding element as a rectangular stack, in accordance with the present invention. Adequate latitude is present between the individual bands and around the band stack, and this latitude is filled with one of the standard filling compounds or with a powder so that the bands or ribbons can glide or slide relative to one another. Due to the gliding or sliding of the twisted bands, a bending of the stranding element is possible and further stranding around a central element is, thus, possible in an intrinsically known way.

This further stranding can occur with a plurality of concentric layers or plies or in the form of further-stranded main bundles. It is thereby important that all bands and all light waveguide fibers, as well as the stranding elements, have the same length on average, wherein this length approximately corresponds to the outer length of the stranding element.

As a result of the twisting of the band stack, it is then possible to arbitrarily orient the band stack along the cable in terms of its angular position or altitude so that the cylindrical stranding element need not absolutely reflect the stack orientation with color stripes, a groove or the like at the outside. The element can, thus, be arbitrarily wound, taken down and stranded.

Further stranding can occur, preferably with a backtwist, in a regular fashion or on the basis of an SZ-stranding, as well. The length of the lay of the band stack and the stranding element amounts to between 100 mm and 1000 mm, whereby the length of the lay of a further stranding should be rather large, preferably above 200 mm.

The material for the envelope of the stranding element is preferably a thermoplastic material selected from a group consisting of polyethylene, polypropylene, polyamide, polycarbonate, and polyester.

Particular tension must be placed on the embodiments wherein the bands or ribbons have corresponding play, but cannot seize or be wedged vis-a-vis one another. The latitude thereby occurring is filled out with an appropriate, intrinsically known filling compound in order to improve the glidability or slidability between the bands.

Other advantages and features of the invention will be readily apparent from the following description of the two exemplary embodiments with reference to the Figures and claims.

DESCRIPTION OF THE PREFERRED EMBODIMENTS

Figure 1:
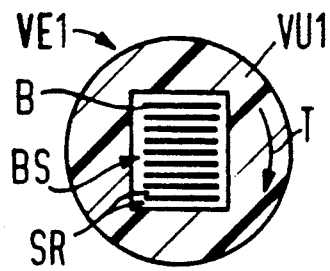
FIG. 1 is a transverse cross sectional view of a stranding element with a tightly packed band stack in accordance with the present invention.
Figure 2:
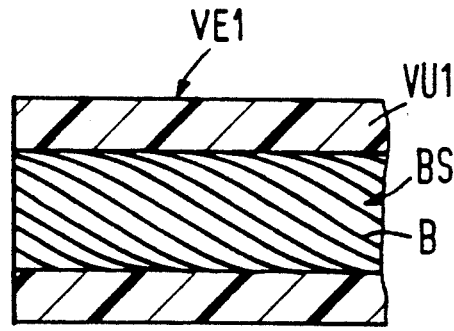
FIG. 2 is a longitudinal cross sectional view of the stranding element of FIG. 1.

The principles of the present invention are particularly useful when incorporated in a stranding element, generally indicated at VE1 in FIGS. 1 and 2. The stranding element VE1 includes a stranding element envelope VU1 having a rectangular cavity that is slightly larger than a band stack BS which is introduced therein. The band stack BS is composed of individual bands or ribbons B, with each of the individual ribbons containing two or more optical waveguide fibers. A slight clearance or latitude SR is provided between the band stack BS and the interior of the cavity, and this space can be filled with a suitable filling compound which is introduced and extends between the individual bands B and between the band stack BS and the walls of the cavity. The rectangular cavity and, thus, the band stack BS situated therein as well are twisted along the stranding element VE1, which twist is indicated by an arrow T. The production of the stranding element essentially occurs so that the band stacks BS are extrusion-coated with appropriate play by a material of the envelope VU1 so that it is embedded in a rectangular chamber of the cylindrical stranding element VE1. During the extrusion, twisting is simultaneously introduced into the stack, whereby this occurs either by transversely rotating the band haul-offs or by turning the capstan and winder of a coil take-up given a stationary haul-off.

As best illustrated in FIG. 2, the twist or torsion of the band stack BS or, respectively, the individual bands B in a longitudinal direction can be seen by the helically-shaped lines.

Figure 3:
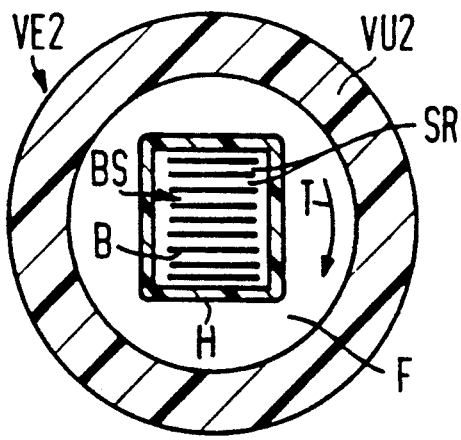
FIG. 3 is a transverse cross sectional view of an embodiment of the stranding element of the present invention utilizing a hollow lead.

In the embodiment illustrated in FIG. 3, a stranding element, generally indicated at VE2, is constructed with a hollow lead VU2. A band stack BS is thereby additionally enveloped within a skin H that is preferably composed of a soft material, such as a thermoplastic, such as polyurethane or the like. A wall thickness of the skin H amounts to between 0.3 mm and 0.5 mm. The band stack BS that is being held together now floats twistably and deformably in the hollow lead VU2, wherein the cavity of the hollow lead is filled with an intrinsically known filling compound F. The stranding element envelope VU2 of the stranding element corresponds to that of FIG. 1 with respect to the materials thereof. The band stack BS is intentionally twisted or additionally twisted during further stranding of the stranding element and can bend outward and move freely within certain limits. The torsional length of lay when stranding and bending the cable can, therefore, be changed or shifted within limits. The torsional direction or direction of twist is indicated by an arrow T in FIG. 3.

The difference between the two embodiments is essentially that the torsion of the band stack BS in the finished cable is not fixed and uniform along the cable, but variable in the embodiment of FIG. 3.

In both embodiments of FIGS. 1 and 3, the stranding element VE1 or the stranding element VE2 has essentially a round or cylindrical cross section.

While the stranding elements VE1 and VE2 are each illustrated as a single element in the drawings, a plurality of these elements can be further-stranded together around a central element in a known manner. For example, they can be stranded around an element in concentric layers or plies or they can be, first, stranded into small stranded bundles which are subsequently stranded around a larger element. During the stranding of these elements, they can be stranded in a regular form or they can be formed with an SZ-form. In addition, the stranding of these elements can be with a backtwist and can have a length of lay during stranding which is preferably greater than 200 mm.

Although various minor modifications may be suggested by those versed in the art, it should be understood that I wish to embody within the scope of the patent granted hereon all such modifications as reasonably and properly come within the scope of my contribution to the art.

I claim:

1. In a stranding element for optical cables, which element includes a band stack formed of a plurality of bands, with each band combining a group of light waveguide fibers, the improvements comprising the band stack being enveloped by a skin and having a substantially rectangular cross section, with the bands being arranged on top of one another in the band stack with play to allow a gliding and sliding motion, but without sufficient play to enable substantial change in the position of the bands in the stack, said band stack being helically twisted and being arranged in a floating manner in a cavity of a stranding element envelope and all light waveguides of each band and all bands arranged in the band stack having substantially the same lengths, which approximately corresponds to the outer length of the stranding element, said stranding element envelope forming a hollow lead so the band stack and the skin is twistable and deformable within the stranding element envelope.

2. In a stranding element according to claim 1, wherein the twist of the band stack is variable along the length of the stranding element.

3. In a stranding element according to claim 1, wherein the skin is composed of a thermoplastic material.

4. In a stranding element according to claim 3, wherein the thermoplastic material is a polyurethane and has a wall thickness in a range of 0.3 mm to 0.5 mm.

5. In a stranding element for optical cables, which element includes a band stack formed of a plurality of bands, with each band combining a group of light waveguide fibers, the improvements comprising the stranding element having a cavity with a rectangular cross section, the band stack having a rectangular cross section only slightly smaller than the cross section of the cavity, said band stack being arranged with a slight amount of play within said cavity, with the bands being arranged on top of one another in the band stack with the play allowing a gliding and sliding motion, but without sufficient play to enable substantial change in the position of the bands in the stack, said band stack being helically twisted and all light waveguides of each band and all bands arranged in the band stack having substantially the same lengths, which approximately corresponds to the outer length of the stranding element.

6. In a stranding element according to claim 5, wherein the length of lay for the band stack in the stranding element amounts to between 100 mm and 1000 mm.

7. In a stranding element according to claim 5, which includes an intrinsically known glide agent selected from cable filling compounds and powders disposed in the cavity of the stranding element envelope.

8. In a stranding element according to claim 5, wherein the bands are twisted.

9. In a stranding element according to claim 5, wherein the band stack is twisted.

10. In a stranding element according to claim 5, wherein each of the individual bands contains a number of light waveguide fibers in a range of 2 to 16 light waveguide fibers.

11. In a stranding element according to claim 5, wherein the stranding element envelope is composed of a thermoplastic material selected from a group consisting of polyethylene, polypropylene, polyamide, polycarbonate and polyester.

12. In a stranding element according to claim 5, wherein each of the stranding elements has a round cross section.

13. In a stranding element according to claim 5, wherein a plurality of the stranding elements of the same type are further-stranded around a central element in a known way to form a cable.

14. In a stranding element according to claim 13, wherein the stranding elements are further-stranded in concentric layers.

15. In a stranding element according to claim 13, wherein the stranding elements are arranged in the form of further-stranded main bundles.

16. In a stranding element according to claim 13, wherein a further stranding occurs in a regular form.

17. In a stranding element according to claim 13, wherein a further stranding occurs with an SZ-form.

18. In a stranding element according to claim 13, wherein the further stranding occurs with a backtwist.

19. In a stranding element according to claim 13, wherein the further stranding has a length of lay greater than 200 mm.

* * * * *